Sept. 24, 1963  E. R. HUMBERT ET AL  3,104,549
BI-DIRECTIONAL PRECISION FLUID FLOW MEASURING APPARATUS
Filed Sept. 28, 1961
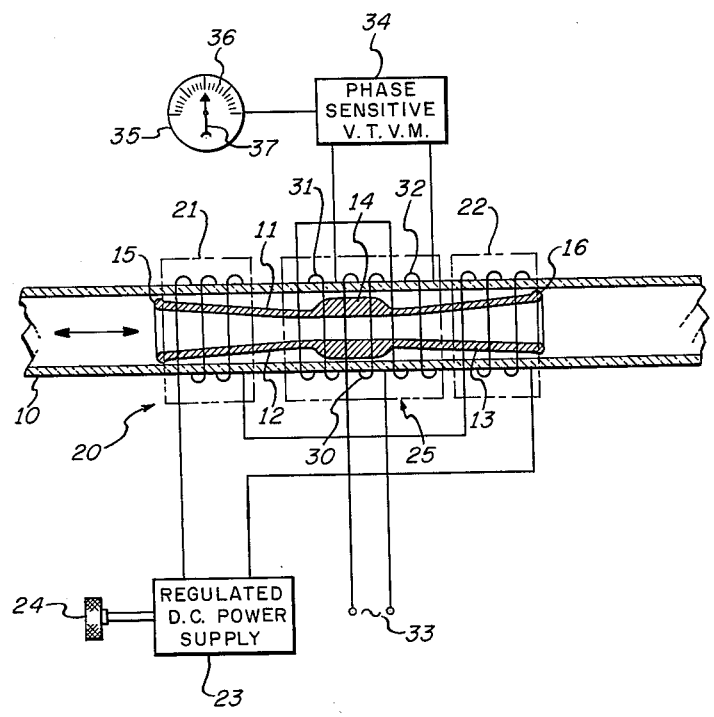
INVENTORS
EDWARD R. HUMBERT
STEPHEN A. NESTOR
BY
ATTORNEY

United States Patent Office 3,104,549
Patented Sept. 24, 1963

3,104,549
BI-DIRECTIONAL PRECISION FLUID FLOW
MEASURING APPARATUS
Edward R. Humbert, Rockville Centre, and Stephen A. Nestor, Bayside, N.Y., assignors to Sperry Rand Corporation, Great Neck, N.Y., a corporation of Delaware
Filed Sept. 28, 1961, Ser. No. 141,464
1 Claim. (Cl. 73—228)

This invention relates to apparatus for measuring the direction and rate of fluid flow precisely and rapidly.

The present invention is an improvement over the apparatus disclosed in copending application Serial No. 51,210 filed August 22, 1960, entitled Precision Fluid Flow Measuring and Controlling Apparatus in that the present apparatus is bi-directional and provides a measure of the direction as well as the rate of flow.

Known flow measuring apparatus of this type, particularly for measuring the flow of blood is disclosed in an article entitled "A Magnetic Flow Meter for Recording Cardiac Output," written by Shirer, Shackelford and Jochim and published in the November 1959 issue of the Proceedings of the I.R.E. on pages 1901 through 1912. Generally, the apparatus disclosed in the above article requires use of electrodes and/or complex electronic equipment, both of which are undesirable.

It is a primary object of the present invention to provide flow measuring apparatus which is bi-directional, simple, extremely accurate, very sensitive to small changes in flow rate and thoroughly reliable.

It is an additional object of the present invention to provide flow measuring apparatus in which the operation of the apparatus is bi-directional and does not disturb the composition of the fluid being measured wherein if the apparatus is rendered inoperative it does not impair the fluid flow.

It is an additional object of the present invention to provide flow measuring apparatus in which the range of fluid flow rates to be measured may be readily varied without impairing the fluid flow in either direction.

These and other objects are achieved by the present invention in which a hollow tubular tapered magnetic element is maintained in a predetermined position by means of electromagnetic biasing coils within a hollow glass conduit through which the fluid to be measured flows. The element is tapered symmetrically about its center to provide for bi-directional fluid flow. The flow of fluid displaces the element and this displacement is measured by a pick-off coil cooperative with an enlarged central portion of the element. The pick-off coil provides a signal representative of the movement of the float which is a measure of the diretcion and rate of fluid flow. This signal is connected to an indicator for providing a precise indication of the direction and rate of flow of the fluid.

The apparatus may be made responsive to provide an indication within a predetermined range of fluid flow rates by varying the magnetic bias provided by the electromagnetic biasing coils.

Further objects will appear from the following specification and claim when read in conjunction with the drawing which is an enlarge view of the sensitive element showing the circuitry and apparatus associated therewith in schematic form.

The present invention will be described for purposes of example as applied to a flow meter of the type utilized for measuring the direction and rate of flow of blood since this application is characteristic of a servere and critical environment requiring precision measurement without undesirably interfering with the fluid flow or changing the composition of the fluid. Although the invention will be described with respect to a flow meter of this type, it will be appreciated that the principles of the invention are equally applicable to flow meters measuring fluids in general including gases or liquids.

Referring to the drawing a non-magnetic conduit 10 through which the fluid to be measured flows is shown horizontally disposed. Preferably, the conduit 10 is made of glass and has a non-wettable polished bore. A hollow tubular magnetic element 11 is positionably disposed for horizontal movement within the conduit 10 and responsive to the fluid flow therethrough. The end portions 12 and 13 of the element 11 are symmetrically tapered with respect to its center in order that the flow of fluid provides a force acting on the tapered portions of the element 11 which causes displacement of the element 11 in accordance with the direction and rate of fluid flow. The tapered portions 12 and 13 of the element 11 enable it to respond to relatively small changes of flow rate while the hollow construction of the element 11 permits fluid flow if the apparatus is inoperative or malfunctioning.

The central portion 14 of the element 11 is enlarged to function as an armature in a manner to be explained. Preferably, the extremities of the element 11 have rounded lips 15 and 16 respectively to minimize friction. Preferably, the outer diameters of the rounded lips 15 and 16 are slightly less than the inside diameter of the conduit 10. By virtue of this construction, the element 11 may only touch the interior of the conduit 10 at two places, i.e., the lips 15 and 16, thus minimizing friction. Further, the fluid flow tends to center the element 11 within the conduit 10 in order that the element 11 either does not contact the conduit 10 or if it does the element 11 contacts the conduit 10 very lightly thereby further tending to eliminate frictional effects. By having the bore of the conduit 10 and the element 11 highly polished adhesion between the element 11, the fluid and the conduit 10 is minimized. The element 11 is non-wettable, corrosion resistant and free from undesirable resistance to flow. The element 11 can be made of any suitable magnetic material; stainless steel is particularly suitable since it resists corrosion otherwise caused by the saline blood.

A magnetic biasing means 20 is disposed adjacent the conduit 10 with its electromagnetic bias coils or windings 21 and 22 cooperative with the tapered portions 12 and 13 respectively and completely surrounding the conduit 10. The windings 21 and 22 are connected to a regulated D.C. power source 23. With the direction of fluid flow as indicated by the arrow, the windings 21 and 22 are supplied with a sufficient amount of current from the source 23 by means of a control knob 24 to provide the amount of magnetic bias necessary to maintain the element 11 in a predetermined poistion against the force of a predetermined flow rate and in the proper relationship to a pick-off assembly 25 in a manner to be more fully described. The current flow through the windings 21 and 22 is in a direction to create a magnetic flux field that is cooperative with the element 11 to maintain it in the aforementioned predetermined position. Preferably, the current from the source 23 is closely regulated to maintain a constant bias for a particular setting of the knob 24 in spite of changes tending to be caused by variations in ambient air temperature, fluid temperature, coil temperature, etc.

The pick-off 25 is disposed between the windings 21 and 22 and adjacent to and surrounding the conduit 10. The pick-off 25 is cooperative with the enlarged portion 14 and responsive to the movement of the element 11 for providing a signal representative of the element movement. Preferably, the pick-off 25 is a hollow cylindrical E-transformer type having an excitation winding 30 mounted on its central stator portion and output windings 31 and 32 mounted on its outer stator portions as viewed in the drawing. The excitation winding 30 is connected to an A.C. excitation source 33 of, for example, 400 cycles. The frequency of the source 33 is held to close tolerances, for example, ±1% variation. The output windings 31 and 32 are connected in series opposition with respect to each other and provide an electrical signal having a phase representative of the direction of fluid flow and an amplitude representative of the rate of flow of the fluid through the conduit 10 in a manner to be more fully described.

The magnetic biasing means 20 and the pick-off 25 are adjustably mounted by means, not shown, for ease in properly spacing the assemblies 20 and 25 with respect to each other and with respect to the element 11. The output windings 31 and 32 are connected to a phase sensitive vacuum tube voltmeter 34 having a zero adjustment arrangement. The voltmeter 34 may include or be connected to a flow indicator 35 to provide a visual indication of the direction and rate of fluid flow with respect to a scale 36. The flow indicator 35 is arranged so that its pointer 37 indicates zero rate of flow with respect to the scale 36 when the element 11 is centered. The flow indicator 35 is further arranged for example, in order that flow from the right side of the conduit 10 causes the pointer 37 to indicate the flow rate to the right of zero while flow from the left side of the conduit 10 causes the pointer 37 to indicate the flow rate to the left of zero.

In operation, the magnetic biasing means 20 and the pick-off 25 are adjustably positioned to the proper locations with respect to each other and the element 11 until the indicator 35 reads zero. Depending upon the range of fluid flow rates to be measured the control knob 24 is adjusted to provide current to produce sufficient magnetic flux to bias the element 11 against the force of a predetermined flow rate greater than that required to overcome any slight static friction. Below the predetermined flow rate, there is no deflection of the pointer 37 of the flow indicator 35.

As the flow rate increases above the predetermined flow rate, the element 11 is driven in proportion to the fluid flow rate and in the direction thereof. The displacement of the element 11 changes the flux density of the magnetic field of the pick-off 25. This unbalanced flux change produces an electrical signal in the form of a voltage which is proportional to the displacement of the element 11 and thus the rate of flow while its phase is representative of the direction of the flow. This signal is applied to the vacuum tube voltmeter 34 and an indication of the direction and rate of flow is provided on the flow indicator 35. When the flow rate returns to the predetermined flow rate, the magnetic bias provided by the electromagnet 20 returns the element 11 to its predetermined position.

The range of flow rates which can be measured by the present invention is determined by the type of fluid to be measured, the diameter of the bore of the element 11, and the bias provided by the biasing means 20. The magnetic bias provided by the biasing means 20 is varied by means of the control knob 24 in order that a range of flow rates from very small to relatively large may be measured by simply varying the magnetic biasing. This results in a multirange instrument in which the travel of the sensitive element 11 is limited to a fraction of an inch thereby providing extreme sensitivity and accuracy. The sensitivity of the measurement is a function among other things of the taper of the bore of the element 11; generally increasing the taper increases the sensitivity.

While the invention has been described in its preferred embodiments, it is to be understood that the words which have been used are words of description rather than of limitation and that changes within the purview of the appended claim may be made without departing from the true scope and spirit of the invention in its broader aspects.

What is claimed is:

Fluid flow responsive apparatus comprising a nonmagnetic conduit through which the fluid is to be measured flows, a hollow tubular magnetic element positionably disposed for movement within said conduit and responsive to the fluid flow, said element being tapered symmetrically about its center and displaceable in accordance with the direction and rate of flow of said fluid, said element further having an enlarged central portion, magnetic biasing means disposed adjacent said conduit and cooperative with the extremities of said element for providing a magnetic field tending to maintain said element in a predetermined position against the force of a predetermined fluid flow rate, said magnetic field, symmetrical shape and fluid flow all tending to maintain said element centered with respect to said conduit, electrical pick-off means disposed adjacent said conduit and cooperative with the enlarged central portion of said element and responsive to the movements of said element for providing a signal representative of said movement, said pick-off means providing a magnetic flux field, said central portion of said element acting as an armature of said pick-off means, and indicating means responsive to said signal for providing an indication of the direction and rate of flow of said fluid.

References Cited in the file of this patent

UNITED STATES PATENTS

| | | |
|---|---|---|
| 2,364,930 | Turner | Dec. 12, 1944 |
| 2,487,083 | Warshaw | Nov. 8, 1949 |
| 2,769,337 | Rich | Nov. 6, 1956 |
| 2,936,614 | Godbey | May 17, 1960 |
| 2,987,915 | Hildenbrandt | June 13, 1961 |